United States Patent
Lee et al.

(10) Patent No.: US 10,341,659 B2
(45) Date of Patent: Jul. 2, 2019

(54) SYSTEMS AND METHODS OF SWITCHING INTERPOLATION FILTERS

(71) Applicant: QUALCOMM Incorporated, San Diego, CA (US)

(72) Inventors: Sungwon Lee, San Diego, CA (US); Wei-Jung Chien, San Diego, CA (US); Kai Zhang, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/724,155

(22) Filed: Oct. 3, 2017

(65) Prior Publication Data

US 2018/0098066 A1 Apr. 5, 2018

Related U.S. Application Data

(60) Provisional application No. 62/404,749, filed on Oct. 5, 2016.

(51) Int. Cl.
*H04N 19/117* (2014.01)
*H04N 19/46* (2014.01)
(Continued)

(52) U.S. Cl.
CPC ......... *H04N 19/117* (2014.11); *H04N 19/136* (2014.11); *H04N 19/139* (2014.11);
(Continued)

(58) Field of Classification Search
CPC .. H04N 19/117; H04N 19/176; H04N 19/523; H04N 19/136; H04N 19/46;
(Continued)

(56) References Cited

U.S. PATENT DOCUMENTS

2004/0062307 A1* 4/2004 Hallapuro ............ H04N 19/159
375/240.13
2007/0195887 A1* 8/2007 Comer ................ H04N 19/176
375/240.21
(Continued)

FOREIGN PATENT DOCUMENTS

WO 2013184954 A2 12/2013

OTHER PUBLICATIONS

International Search Report and Written Opinion—PCT/US2017/055390—ISA/EPO—Mar. 19, 2018.
(Continued)

*Primary Examiner* — Marnie A Matt
(74) *Attorney, Agent, or Firm* — Polsinelli LLP

(57) ABSTRACT

Systems, methods, and apparatus are provided for adaptively switching interpolation filters during the encoding of video data or the decoding of a video bitstream. In various implementations, a set of interpolation filters can be defined and made available to coding device. The coding device can select an interpolation filter for a given coding unit. The interpolation filter can be selected based on, for example, the coding level of the coding unit, among other things. In some examples, signaling of the selected interpolation filter can be simplified by selecting a subset of the set of interpolation filters for a given coding situation. An index indicating an interpolation filter from the subset can then be signaled. Alternatively, a decoder can derive an identity of the interpolation filter from data provided by a bitstream, in which case the index need not be explicitly signaled in the bitstream.

35 Claims, 10 Drawing Sheets

(51) Int. Cl.
*H04N 19/82* (2014.01)
*H04N 19/136* (2014.01)
*H04N 19/139* (2014.01)
*H04N 19/159* (2014.01)
*H04N 19/176* (2014.01)
*H04N 19/184* (2014.01)
*H04N 19/513* (2014.01)
*H04N 19/523* (2014.01)
*H04N 19/59* (2014.01)
*H04N 19/463* (2014.01)

(52) U.S. Cl.
CPC ......... *H04N 19/159* (2014.11); *H04N 19/176* (2014.11); *H04N 19/184* (2014.11); *H04N 19/46* (2014.11); *H04N 19/521* (2014.11); *H04N 19/523* (2014.11); *H04N 19/59* (2014.11); *H04N 19/82* (2014.11); *H04N 19/463* (2014.11)

(58) Field of Classification Search
CPC .... H04N 19/139; H04N 19/59; H04N 19/159; H04N 19/184; H04N 19/82; H04N 19/521; H04N 19/463
See application file for complete search history.

(56) References Cited

U.S. PATENT DOCUMENTS

| | | | | |
|---|---|---|---|---|
| 2008/0089417 | A1* | 4/2008 | Bao | H04N 19/176 375/240.16 |
| 2009/0257499 | A1* | 10/2009 | Karczewicz | H04N 19/70 375/240.16 |
| 2011/0096829 | A1* | 4/2011 | Han | H04N 19/44 375/240.02 |
| 2011/0158324 | A1* | 6/2011 | Yoshino | H04N 19/139 375/240.24 |
| 2011/0243222 | A1* | 10/2011 | Choi | H04N 19/159 375/240.03 |
| 2011/0243249 | A1* | 10/2011 | Lee | H04N 19/176 375/240.25 |
| 2011/0243471 | A1* | 10/2011 | Alshina | H04N 19/48 382/248 |
| 2012/0033728 | A1* | 2/2012 | Cho | H04N 19/124 375/240.03 |
| 2012/0230407 | A1* | 9/2012 | Minoo | H04N 19/46 375/240.14 |
| 2012/0294368 | A1* | 11/2012 | Kondo | H04N 19/132 375/240.16 |
| 2013/0177084 | A1* | 7/2013 | Wang | H04N 19/176 375/240.16 |
| 2013/0329782 | A1* | 12/2013 | Seregin | H04N 19/159 375/240.02 |
| 2014/0010282 | A1* | 1/2014 | He | H04N 21/23439 375/240.02 |
| 2014/0112391 | A1* | 4/2014 | Matsuo | H04N 19/139 375/240.16 |
| 2015/0264374 | A1* | 9/2015 | Xiu | H04N 19/176 375/240.25 |
| 2018/0027255 | A1* | 1/2018 | Alshina | H04N 19/117 375/240.16 |

OTHER PUBLICATIONS

Chen J., et al., "Algorithm description of Joint Exploration Test Model 3 (JEM3)", 3, JVET Meeting; May 26, 2016-Jun. 1, 2016; Geneva; (The Joint Video Exploration Team of ISO/IEC JTC1/SC29/WG11 and ITU-T SG.16); URL: http://phenix.int-evry.fr/jvet/ ,, No. JVET-C1001_v1, Jul. 2, 2016 (Jul. 2, 2016), XP030150223, 38 Pages.

Partial International Search Report—PCT/US2017/055390—ISA/EPO—Jan. 22, 2018.

* cited by examiner

FIG. 3

SYSTEMS AND METHODS OF SWITCHING INTERPOLATION FILTERS

CROSS-REFERENCES TO RELATED APPLICATIONS

This application claims the benefit of and priority to U.S. Provisional Application No. 62/404,749, filed on Oct. 5, 2016, which is hereby incorporated by reference herein in its entirety.

FIELD

This application is related to switching an interpolation filter to be used in motion estimation (ME) and motion compensation (MC) processes in the context of advanced video codecs, including codes being developed in the Joint Exploration Model (JEM). For example, the proposed methods improve the performance of inter-layer prediction by adopting multiple interpolation filters in an adaptive fashion.

BACKGROUND

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC), as well as Joint Collaboration Team on 3D Video Coding Extension Development (JCT-3V) of ITU-T Video Coding Experts Group (VCEG) and ISO/IEC Motion Picture Experts Group (MPEG).

In 2016, MPEG and ITU-T VCEG formed a joint exploration video team (JVET) to explore new coding tools for the next generation of video coding standard. The reference software is called JEM (joint exploration model).

SUMMARY

Video compression technologies perform spatial and temporal prediction to reduce or remove the redundancy inherent in input video signals. In order to reduce temporal redundancy (that is, visual similarities in neighboring frames), motion estimation is carried out to track the movement of objects in a video. Motion vectors can indicate a displacement in pixel unit distances. In some cases, motion vectors can have higher degrees of precision than integer-pixel precision, such as half-pixel, quarter-pixel, or $\frac{1}{16}$-pixel distances. Finer degrees of precision can enable a video coder to track a motion field with more accuracy, and thus obtain better prediction.

According to at least one example, a method of encoding video data is provided that includes obtaining the video data. The method further includes determining, for a coding unit, a subset of interpolation filters from a set of interpolation filters, wherein the subset of interpolation filters is determined based on information, in the video data, associated with the coding unit. The method further includes encoding the coding unit, wherein encoding the coding unit includes selecting an interpolation filter for motion estimation and motion compensation for the coding unit, wherein the interpolation filter is selected from the subset of interpolation filters. The method further includes generating an encoded video bitstream, wherein the encoded video bitstream includes the encoded coding unit.

In another example, an apparatus is provided that includes a memory configured to store video data and a processor. The processor is configured to and can obtain the video data. The processor is configured to and can determine, for a coding unit, a subset of interpolation filters from a set of interpolation filters, wherein the subset of interpolation filters is determined based on information, in the video data, associated with the coding unit The processor is configured to and can encode the coding unit, wherein encoding the processing includes selecting an interpolation filter for motion estimation and motion compensation, wherein the interpolation filter is selected from the subset of interpolation filters. The processor is configured to and can generate an encoded video bitstream, wherein the encoded video bitstream includes the encoded coding unit.

In another example, a computer readable medium is provided having stored thereon instructions that when executed by a processor perform a method that includes: obtaining video data. The method further includes determining, for a coding unit, a subset of interpolation filters from a set of interpolation filters, wherein the subset of interpolation filters is determined based on information, in the video data, associated with the coding unit. The method further includes encoding a coding unit, wherein encoding the coding unit includes selecting an interpolation filter for motion estimation and motion compensation for the coding unit, wherein the interpolation filter is selected from a set of interpolation filters. The method further includes generating an encoded video bitstream, wherein the encoded video bitstream includes the encoded coding unit.

In another example, an apparatus is provided that includes means for obtaining video data. The apparatus further includes means for determining, for a coding unit, a subset of interpolation filters from a set of interpolation filters, wherein the subset of interpolation filters is determined based on information, in the video data, associated with the coding unit. The apparatus further comprises means for encoding the coding unit, wherein encoding the coding unit includes selecting an interpolation filter for motion estimation and motion compensation for the coding unit, wherein the interpolation filter is selected from the subset of interpolation filters. The apparatus further comprises means for generating an encoded video bitstream, wherein the encoded video bitstream includes the encoded coding unit.

In some aspects, the methods, apparatuses, and computer readable medium described above further comprise determining a subset of interpolation filters from the set of interpolation filters, wherein the subset of interpolation filters is determined based on a coding level of the coding unit, and wherein the interpolation filter is determined from the subset of interpolation filters.

In some aspects, the methods, apparatuses, and computer readable medium described above further comprise determining a subset of interpolation filters from the set of interpolation filters, wherein the subset of interpolation filters is determined based on a prediction mode for the coding unit, and wherein the interpolation filter is determined from the subset of interpolation filters.

In some aspects, the methods, apparatuses, and computer readable medium described above further comprise determining a subset of interpolation filters from the set of interpolation filters, wherein the subset of interpolation filters is determined based on the motion information, and wherein the interpolation filter is determined from the subset of interpolation filters.

In some aspects, the methods, apparatuses, and computer readable medium described above further comprise determining a subset of interpolation filters from the set of interpolation filters, wherein the subset of interpolation filters is determined based on a coding tool used to code the coding unit, and wherein the interpolation filter is determined from the subset of interpolation filters.

In some aspects, the interpolation filter is selected from a previously coded block. In some aspects, the interpolation filter is selected from a neighboring block of the coding unit.

In some aspects, the methods, apparatuses, and computer readable medium described above further comprise merging the interpolation filter with a second interpolation filter, wherein a resulting merged interpolation filter is used for the motion estimation.

In some aspects, the interpolation filter is associated with a second interpolation filter, wherein the interpolation filter is for an integer pixel location, and wherein the second interpolation filter is for a fractional pixel location.

In some aspects, the interpolation filter and the second interpolation filter have different cut-off frequencies.

In some aspects, the encoded video bitstream includes a value identifying the interpolation filter.

In some aspects, the set of interpolation filters are not signaled with the encoded video bitstream, and wherein an identity of the interpolation filter can be implied from the encoded video bitstream.

In some aspects, an apparatus as described above can include a camera for capturing pictures.

According to at least one example, a method of decoding video data is provided that includes obtaining an encoded video bitstream. The method further includes determining a reference frame for a coding unit in a current frame from the encoded video bitstream. The method further includes determining a subset of interpolation filters from a set of interpolation filters, wherein the subset of interpolation filters is determined based on information, in the encoded video bitstream, associated with the coding unit. The method further includes determining an interpolation filter from the subset of interpolation filters. The method further includes using the reference frame and the interpolation filter to reconstruct the coding unit.

In another example, an apparatus is provided that includes a memory configured to store video data and a processor. The processor is configured to and can obtain an encoded video bitstream. The processor is configured to and can determine a reference frame for a coding unit in a current frame from the encoded video bitstream. The processor is further configured to determine a subset of interpolation filters from a set of interpolation filters, wherein the subset of interpolation filters is determined based on information, in the encoded video bitstream, associated with the coding unit. The processor is configured to and can determine an interpolation filter from the subset of interpolation filters. The processor is configured to and can use the reference frame and the interpolation filter to reconstruct the coding unit.

In another example, a computer readable medium is provided having stored thereon instructions that when executed by a processor perform a method that includes: obtaining an encoded video bitstream. The method further includes determining a reference frame for a coding unit in a current frame from the encoded video bitstream. The method further includes determining a subset of interpolation filters from a set of interpolation filters, wherein the subset of interpolation filters is determined based on information, in the encoded video bitstream, associated with the coding unit. The method further includes determining an interpolation filter from a set of interpolation filters. The method further includes using the reference frame and the interpolation filter to reconstruct the coding unit.

In another example, an apparatus is provided that includes means for obtaining an encoded video bitstream. The apparatus further comprises means for determining a reference frame for a coding unit in a current frame from the encoded video bitstream. The apparatus further includes a means for determining a subset of interpolation filters from a set of interpolation filters, wherein the subset of interpolation filters is determined based on information, in the encoded video bitstream, associated with the coding unit. The apparatus further comprises means for determining an interpolation filter from the subset of interpolation filters. The apparatus further comprises means for using the reference frame and the interpolation filter to reconstruct the coding unit.

In some aspects, the methods, apparatuses, and computer readable medium described above further comprise determining a subset of interpolation filters from the set of interpolation filters, wherein the subset of interpolation filters is determined based on a coding level of the coding unit, and wherein the interpolation filter is determined from the subset of interpolation filters.

In some aspects, the methods, apparatuses, and computer readable medium described above further comprise determining a subset of interpolation filters from the set of interpolation filters, wherein the subset of interpolation filters is determined based on a prediction mode for the coding unit, and wherein the interpolation filter is determined from the subset of interpolation filters.

In some aspects, the methods, apparatuses, and computer readable medium described above further comprise determining a subset of interpolation filters from the set of interpolation filters, wherein the subset of interpolation filters is determined based on motion information, and wherein the interpolation filter is determined from the subset of interpolation filters.

In some aspects, the methods, apparatuses, and computer readable medium described above further comprise determining a subset of interpolation filters from the set of interpolation filters, wherein the subset of interpolation filters is determined based on a coding tool used to code the coding unit, and wherein the interpolation filter is determined from the subset of interpolation filters.

In some aspects, wherein the interpolation filter is selected from a previously coded block. In some aspects, the interpolation filter is selected from a neighboring block.

In some aspects, the methods, apparatuses, and computer readable medium described above further comprise merging the interpolation filter with a second interpolation filter, wherein a resulting merged interpolation filter is used for reconstructing the prediction unit.

In some aspects, the interpolation filter is associated with to a second interpolation filter, wherein the interpolation filter is for an integer pixel location, and wherein the second interpolation filter is for a fractional pixel location. In some aspects, the interpolation filter and the second interpolation filter have different cut-off frequencies.

In some aspects, the encoded video bitstream includes a value identifying the interpolation filter.

In some aspects, the methods, apparatuses, and computer readable medium described above further comprise deriving an identity of the interpolation filter using the encoded video bitstream.

In some aspects, an apparatus as described above can include a camera for capturing pictures. In some aspects, the apparatus can include a display for displaying video data.

BRIEF DESCRIPTION OF THE DRAWINGS

Illustrative embodiments of the present invention are described in detail below with reference to the following drawing figures:

FIG. 3 illustrates an example of fractional pixel positions.

DETAILED DESCRIPTION

Figure 1:
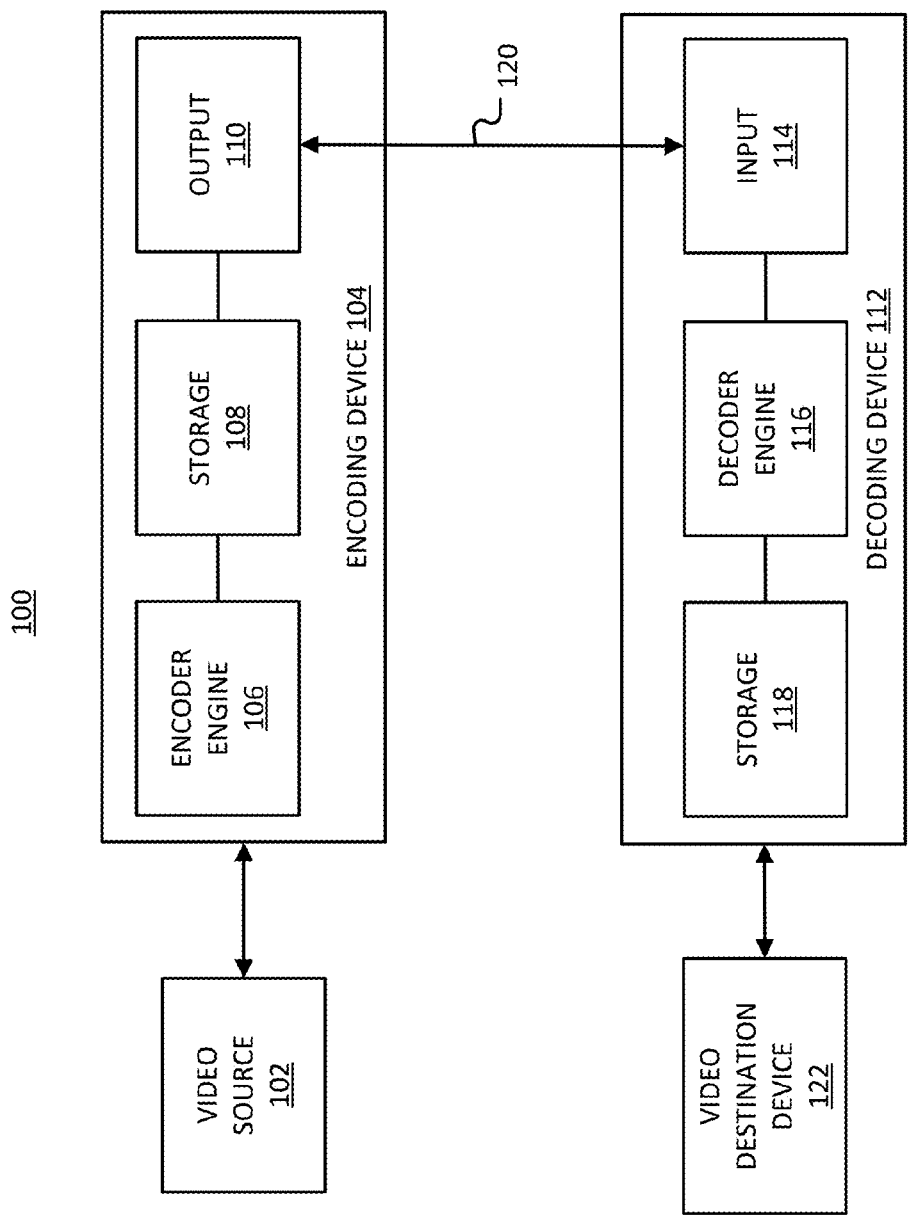
FIG. 1 is a block diagram illustrating an example of an encoding device and a decoding device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality. As used herein, "coding" refers to "encoding" or "decoding".

FIG. 1 is a block diagram illustrating an example of a video coding system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model).

Many examples described herein provide examples using the JEM model, the HEVC standard, and/or extensions thereof. However, the techniques and systems described herein may also be applicable to other coding standards, such as AVC, MPEG, extensions thereof, or other suitable coding standards that currently exist or future coding standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision, or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or the like) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units including VCL NAL units and non-VCL NAL units. VCL NAL units include coded picture data forming a coded video bitstream. For example, a sequence of bits forming the coded video bitstream is resent in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116 or to storage 118 for later use by the decoder engine 116. The decoder engine 116 may decode the encoded video bitstream data by entropy decoding (e.g., using an entropy decoder) and extracting the elements of the one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 9. An example of specific details of the decoding device 112 is described below with reference to FIG. 10.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

Video compression technologies perform spatial and temporal prediction to reduce or remove the redundancy inherent in input video signals. In order to reduce temporal redundancy (that is, visual similarities in neighboring frames), motion estimation is carried out to track the movement of objects in a video. Motion estimation is a process of identifying, for a given block of pixels from a current frame, a best matching (e.g., most similar) block of pixels in a reference frame (or in two reference frames for bi-prediction). One or more reference frames can be identified for a current block using one or more reference indices. The block of pixels in the reference frame can be referred to as a candidate block, predictor, or prediction block. The size of the block can vary. The offset between the current block from the current frame and the candidate block from the reference frame can be characterized by a motion vector, which can indicate a degree of displacement and a direction of displacement.

Motion vectors can indicate a displacement in pixel unit distances. In some cases, motion vectors can have higher degrees of precision than integer-pixel precision, such as half-pixel, quarter-pixel, or $\frac{1}{16}$-pixel distances. Finer degrees of precision can enable a video coder to track a motion field with more accuracy, and thus obtain better prediction.

When the video coder is reconstructing a frame and encounters a motion vector with fractional pixel values, the video coder can conduct interpolation to generate fractional pixel values. For example, and as discussed further below, the video coder can apply an interpolation filter to available pixels to produce interpolated pixels for half-pixel, quarter-pixel, or some other fractional pixel position.

Many video codecs use a fixed interpolation filter. With a fixed interpolation filter, both the encoder and the decoder can be provided with the filter coefficients in advance, and the coefficients need not be provided in an encoded bitstream.

Motion estimation and motion compensation, however, can be optimized by using optimal interpolation filters, rather than fixed filters. The best filters for a given situation tend to be highly localized and content-dependent. Using optimal filters can thus increase encoder complexity and/or can significantly increase signaling overhead, in that the filter coefficients would need to be transmitted from the encoder to the decoder.

In various implementations, provided are systems and methods in which different interpolation filters can be applied to different coding units, and can be signaled with minimal additional increase to the size of a coded bitstream. For example, for HEVC, a particular set of filter candidates can be available when a coding unit is at the sequence level, the picture level, the coding tree unit level, the coding unit level, the transform unit level, or the prediction unit level, among others. Additionally, for JEM, a particular set of filter candidates can be available at the quadtree plus binary tree (QTBT) level, among others. Herein, a coding unit may also be referred to as a block. In these and other examples, a video coder can switch between interpolation filters while encoding a video or decoding a bitstream.

In various implementations, a set of N filters, each having different characteristics (e.g., filter length, cut-off frequencies, transition band, or amount of ripples, among other characteristics), can be defined. For blocks at different coding levels, a subset of the set of N filters can be defined. Using various criteria, an encoder can select a filter from the subset of filters. The selected filter can then be signaled or indicated, explicitly or implicitly, to the decoder. The subset of filters that applies at a given level can vary based on certain criteria, such as the hit ratio of filters in previously coded blocks, among other criteria. In some implementations, filter selections for chroma components or integer pixel positions can also be signaled, implicitly or implicitly, using a similar mechanism.

Figure 2:
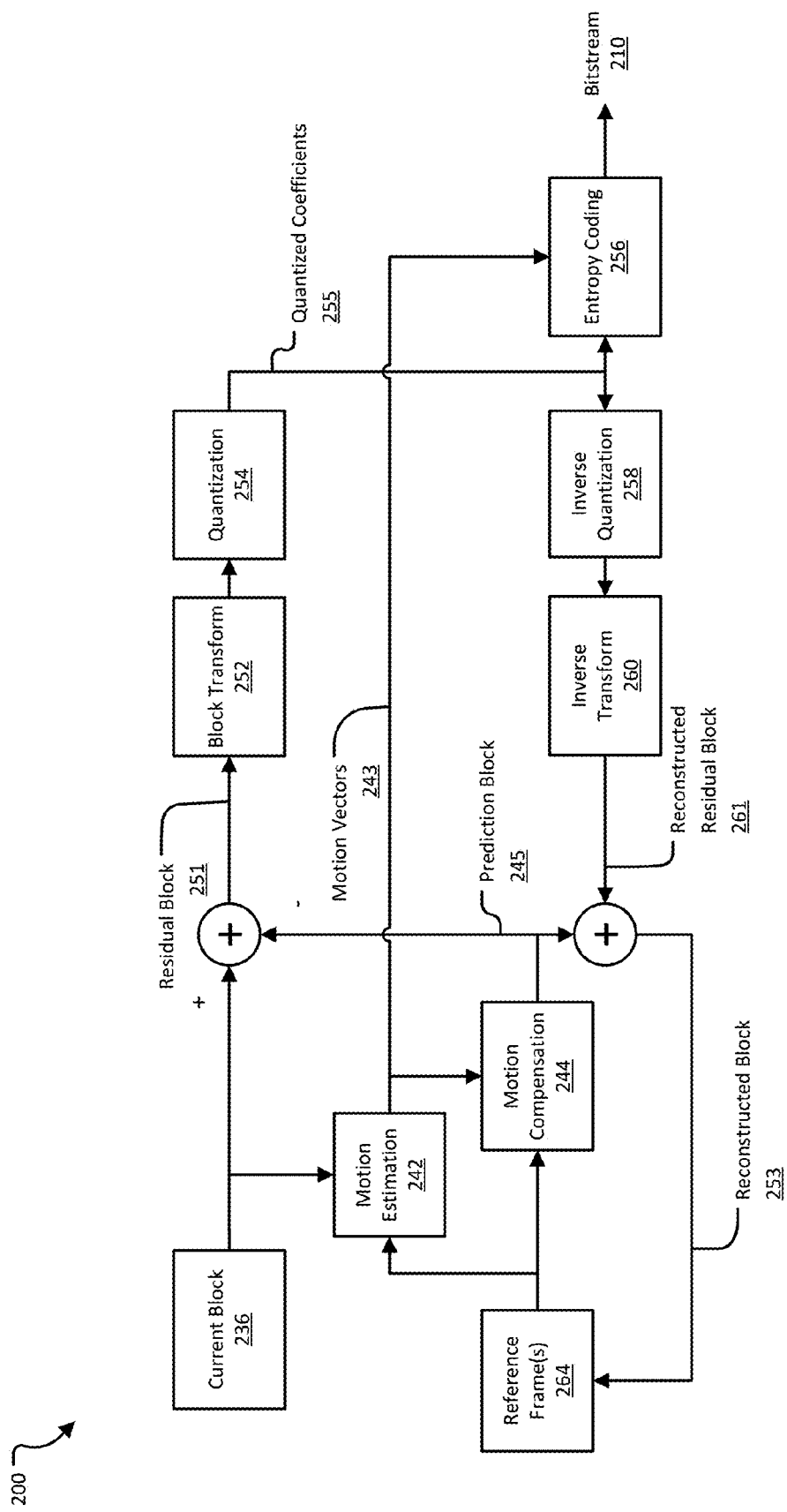
FIG. 2 illustrates an example of an encoding process for a current block from a current frame.

FIG. 2 illustrates an example of an encoding process 200 for a current block 236 from a current frame. The current block 236 can also be referred to as a coding unit. The current block 236 can be less than the entire current frame.

In this example, the encoding process 200 first conducts motion estimation 242 on the current block 236. Motion estimation 242 can include identifying one or more reference frames from among available reference frames 264. The reference frames can include a frame that occurs before, temporally, or after the current frame. Conducting motion estimation 242 can include searching a search area in the reference frame(s) for a region that "best" matches the current block 236. The best match can be determined, for example, by subtracting a candidate region from the current block 236 to determine a residual energy. In this example, the candidate region with the lowest residual energy can be chosen as the best match.

Motion estimation 242 further includes producing motion vectors 243, which estimate a direction and degree of movement for the current block 236, relative to the reference frame(s). In most cases, one or more reference indexes are associated with a motion vector, where the reference indexes identify the reference frame(s) that were used to determine the motion vectors. In some cases, after motion estimation, the best motion vector can be selected, using, for example a rate distortion model.

Motion compensation 244 can include generating a prediction block 245 by executing motion compensation using the best motion vector. The prediction block 245 is a block selected from a reference from using the best motion vector. The prediction block 245 can be subtracted from the current block 236 to product a residual block 251. Block transform 252 can be applied to the residual block 251. The resulting transform coefficients can undergo quantization 254 to produced quantized coefficients 255. Entropy coding 256 can be applied to the quantized coefficients 255 to further reduce the bitrate and produce an encoded bitstream 210.

The quantized coefficients 255 can also be input into inverse quantization 258 and then an inverse transform 260. Inverse quantization 258 and inverse transform 260 are the reverse of the block transform 252 and quantization 254 steps, and produce a reconstructed residual block 261. The reconstructed residual blocks 261 can be added to the predicted block 245 to product a reconstructed block 253. The reconstructed block 253 is approximately the same as the current block 236. The reconstructed video block 253 can be includes in a reference frame to be used for encoding additional blocks.

The example process 200 primarily describes temporal motion estimation. In other examples, an encoding process, such as H.264/AVC and HEVC encoding processes, can also conduct spatial prediction to produce intra-coded blocks. Encoding processes are described in greater detail with respect to FIG. 9.

As noted previously, a best matching reference block for a current block can be at a full pixel offset from the current block, or at a fractional pixel offset. When motion information indicates that the best match is at a fractional pixel position, a video coder can reconstruct a block by interpolating pixels at the fractional positions from the pixels in a reference block.

Figure 3:
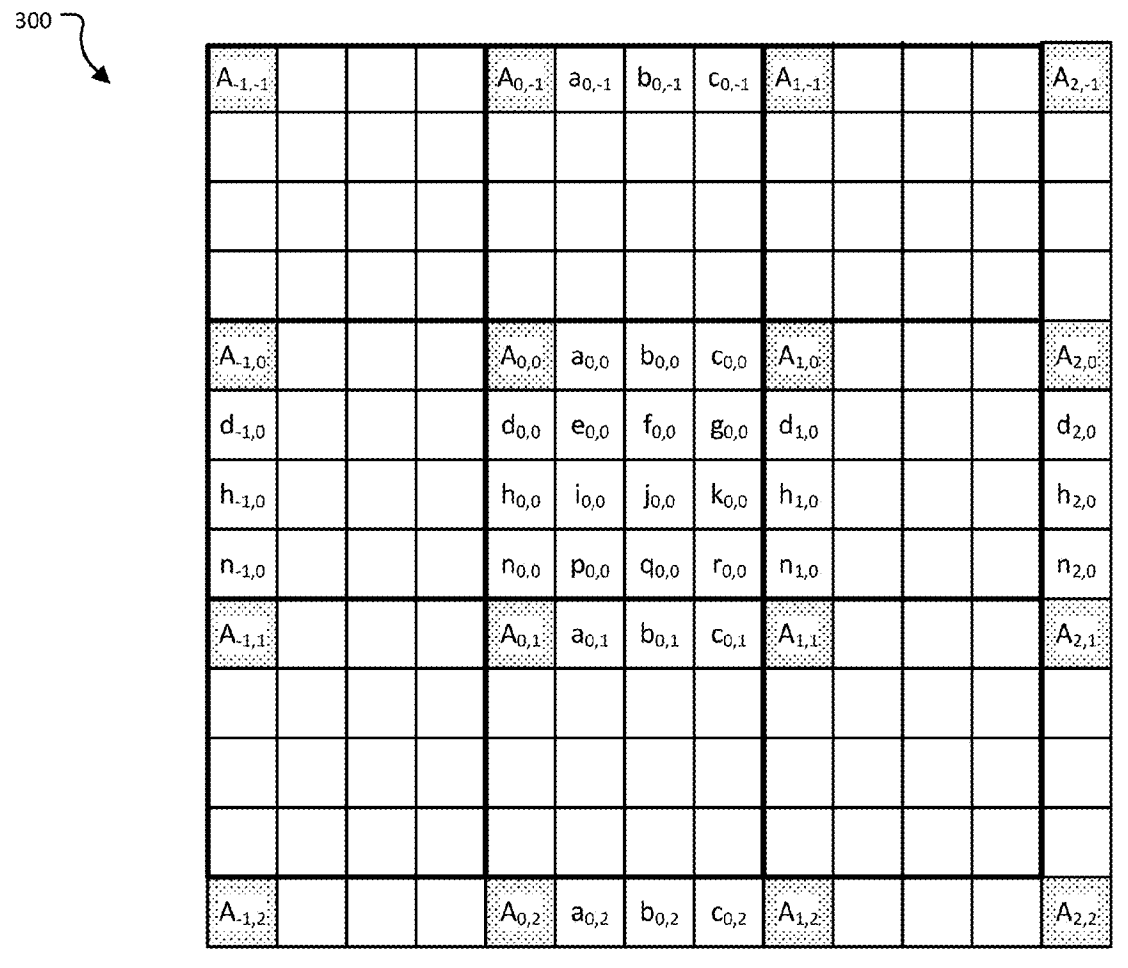

FIG. 3 illustrates an example of fractional pixel positions. In the example of FIG. 3, a block 300 from a reference frame that is three pixels wide and three pixels high is illustrated. Integer pixel positions are illustrated using shaded blocks with capital letters (e.g., $A_{0,0}$, $A_{1,0}$, $A_{0,1}$, $A_{-1,0}$, $A_{0,-1}$, $A_{1,1}$, $A_{1,-1}$, $A_{-1,1}$, and $A_{-1,-1}$). Quarter pixel positions, also referred to herein as sub-pixel positions, are illustrated using lower case letters (e.g. $a_{0,0}$, $b_{0,0}$, $c_{0,0}$, etc.). In this example, there are 15 sub-pixel positions per pixel position, labeled a through r (note that "1" and "o" were omitted, for clarity).

Various methods can be used to derive samples for the sub-pixel positions. For example, the sample at the half-pixel position $b_{0,0}$ can be generated by average the pixels at positions $A_{0,0}$ and $A_{1,0}$. As another example, the pixels at positions $A_{-1,0}$, $A_{1,0}$, $A_{0,0}$, and $A_{2,0}$ from the neighboring block can be averaged to produce a sample for position $b_{0,0}$.

In HEVC, horizontal sub-pixel samples for positions $a_{0,0}$, $b_{0,0}$, and $c_{0,0}$, and vertical sub-pixel samples for positions $d_{0,0}$, $h_{0,0}$, and $n_{0,0}$ can be derived by applying an 8-tap filter to the nearest integer position samples. Samples for positions $e_{0,0}$, $i_{0,0}$, $p_{0,0}$, $f_{0,0}$, $j_{0,0}$, $q_{0,0}$, $g_{0,0}$, $k_{0,0}$, and $r_{0,0}$ can be derived by applying an 8-tap filter to the samples at positions $a_{0,i}$, $b_{0,i}$ and $c_{0,i}$, where i=−3 . . . 4. An example of an 8-tap luma interpolation filter is illustrated in Table 1

TABLE 1

| Phase Shift | Coefficients |
|---|---|
| 0 | {0, 0, 0, 64, 0, 0, 0, 0}, |
| 1 | {−1, 4, −10, 58, 17, −5, 1, 0}, |
| 2 | {−1, 4, −11, 40, 40, −11, 4, −1}, |
| 3 | {0, 1, −5, 17, 58, −10, 4, −1}, |

Table 1 includes eight coefficients per phase shift, one for each tap. Each phase shift corresponds to a quarter-pixel position. For example, phase shift 1 can correspond to sub-pixel positions $a_{0,0}$ and $d_{0,0}$, phase shift 2 can correspond to sub-pixel positions $b_{0,0}$ and $h_{0,0}$, and so on. In other examples, filters with longer taps (e.g., having more coefficients) can be applied. Filter with longer taps can have different characteristics than an 8-tap filter, and can require more complex computations when applied.

In other video codecs, including the codec being developed in JEM, a 1/16 sub-pixel motion vector resolution can be enabled. With 1/16 sub-pixel positions, filters with 16 phases can be used for interpolation. An example filter with 16 phases is provided in Table 2. In JEM, however, 8-tap filters, with fixed coefficients, are used.

TABLE 2

| Phase shift | Coefficients |
|---|---|
| 0 | {0, 0, 0, 64, 0, 0, 0, 0}, |
| 1 | {0, 1, −3, 63, 4, −2, 1, 0}, |
| 2 | {−1, 2, −5, 62, 8, −3, 1, 0}, |
| 3 | {−1, 3, −8, 60, 13, −4, 1, 0}, |
| 4 | {−1, 4, −10, 58, 17, −5, 1, 0}, |
| 5 | {−1, 4, −11, 52, 26, −8, 3, −1}, |
| 6 | {−1, 3, −9, 47, 31, −10, 4, −1}, |
| 7 | {−1, 4, −11, 45, 34, −10, 4, −1}, |
| 8 | {−1, 4, −11, 40, 40, −11, 4, −1}, |
| 9 | {−1, 4, −10, 34, 45, −11, 4, −1}, |

TABLE 2-continued

| Phase shift | Coefficients |
| --- | --- |
| 10 | {−1, 4, −10, 31, 47, −9, 3, −1}, |
| 11 | {−1, 3, −8, 26, 52, −11, 4, −1}, |
| 12 | {0, 1, −5, 17, 58, −10, 4, −1}, |
| 13 | {0, 1, −4, 13, 60, −8, 3, −1}, |
| 14 | {0, 1, −3, 8, 62, −5, 2, −1}, |
| 15 | {0, 1, −2, 4, 63, −3, 1, 0} |

Referring to FIG. 2, content adaptive binary arithmetic coding (CABAC) is one system that can be used in entropy coding 256, to encode and decode syntax elements in a bitstream. CABAC can achieve good compression performance by selecting probability models for each syntax element, using the element's context; by adapting probability estimates based on local statistics; and using arithmetic coding instead of variable-length coding.

CABAC uses Binary Arithmetic Coding, which means that only binary decisions (1 or 0) are encoded. A non-binary-value symbol (e.g., a transform coefficient or motion vector, or any symbol with two or more possible values) is "binarised" or converted to a binary code prior to arithmetic coding. For each bit of a binarised symbol, a context model is then selected. A context model is a probability model for one or more bins of the binarised symbol. The context model is chosen from available models based on the statistics of recently-coded data symbols. The context model stores the probability of each bin as being '1' or '0'. An arithmetic coder then encodes each bin according to the selected probability model. The selected context model is then updated based on the actual coded value (e.g., if the bin value was '1', the frequency count of '1's' is increased).

as an example, three candidate context models named skip_flag_C[0], skip_flag_C[1] and skip_flag_C[2] can be used to code the syntax element cu_skip_flag. To choose the appropriate context from the three candidates, a selection value x is calculated as:

$$x=(cu\_skip\_flag[xNbL][yNbL]\&\& \text{ available}L)+ (cu\_skip\_flag[xNbA][yNbA]\&\& \text{ available}A)$$

For the above equation, the context models to use can be determined as follows:

(x0, y0) specifies the location of the top-left luma sample of the current luma block relative to the top-left sample of the current picture.

The location (xNbL, yNbL) can be set to (x0-1, y0) and the variable availableL can indicate the availability of a block located directly to the left of the current block.

The location (xNbA, yNbA) can be set equal to (x0, y0-1) and the variable availableA can specifyi the availability of a coding block located directly above the current block.

cu_skipflag[xNbL][yNbL] and cu_skip_flag[xNbA][yNbA] can represent the cu_skip_flag for a first block (block L) and a second block (block A), respectively.

As noted above, HEVC and the codec implemented by JEM use a fixed interpolation filter when sub-pixel motion vectors are enabled. The interpolation filter may be less than optimal for any given situation. For example, a filter with a higher cut-off frequency may be more appropriate when a coding unit has more detail, so that the detail can be preserved when interpolation is conducted. As another example, a filter with a lower cut-off frequency may be more appropriate when a process unit has less detail, so that the coding unit can be coded with fewer bits.

Motion estimation and motion compensation can be optimized by using optimal interpolation filters, rather than fixed filters. The best filters for a given situation tend to be highly localized and content-dependent. Using optimal filters can thus increase encoder complexity and/or can significantly increasing signaling overhead, in that the filter coefficients would need to be transmitted from the encoder to the decoder.

Figure 4:
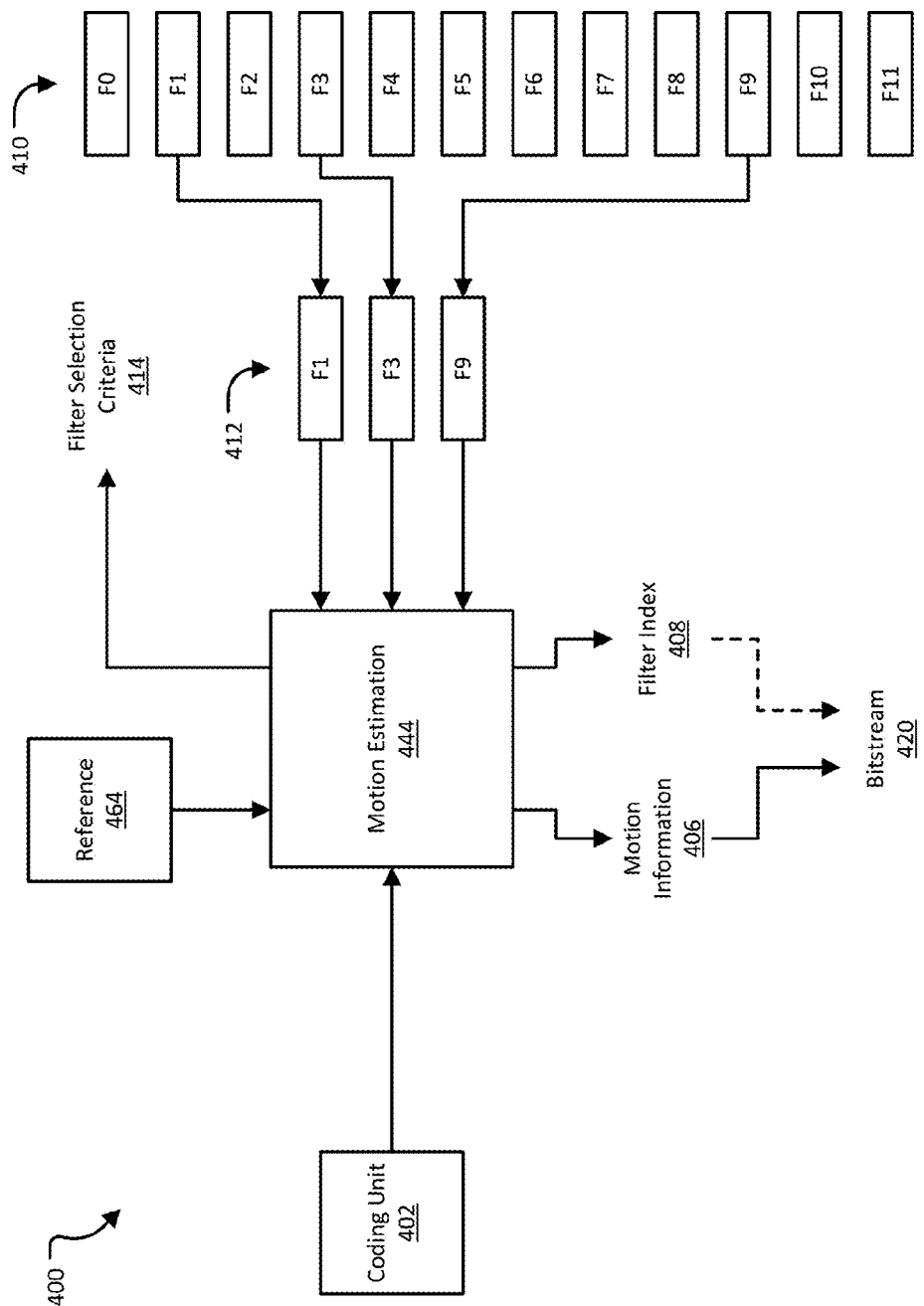
FIG. 4 illustrates an example of the motion estimation step of an encoding process.

In various implementations, a video coder can be configured to switch between available interpolation filters when conducting motion estimation and motion compensation for different prediction units. In some cases, inter-layer prediction can be improved by selecting interpolation filters in an adaptive manner. In various implementations, a set of N filters can be defined, each having characteristics such as filter lengths, cut-off frequencies, transition bands, an amount of ripples, and/or a combination of characteristics.

f 400. Also illustrated in FIG. 4 are a set of filters 410, which represent all the filters that have been defined for use by the codec. As discussed above, in the motion estimation 444 step, a reference block from a reference frame 464 is determined. The reference block is a portion of reference frame 464 that best matches (e.g., is most similar to) the coding unit 402, in terms appearance. In this example, the coding unit 402 can be a sequence, a picture, a slice, a coding tree unit, a coding unit, a transform unit, a prediction unit, or some other block of video data. Using the reference block, motion estimation 444 can determine motion information 406 for the coding unit 402. The motion information 406 can include one or more motion vectors and an index that can be used to identify the reference frame, among other things.

In the example of FIG. 4, the motion estimation 444 step can also determine a filter selection criteria 414. The filter selection criteria 414 can be used to select a subset of filters 412 (also referred to herein as filter candidates) that are applicable to the particular coding unit 402. For example, in some implementations, the filter selection criteria 414 can be the coding level of the coding unit 402 (e.g., sequence level, picture level, slice level, coding tree unit level, coding unit level, transform unit level, prediction unit level, etc.). In this example, the subset of filters 412 can be selected based on the coding level of the coding unit 402. For example, the particular filters in the subset and the number of filters in the subset can change over different processing levels.

In various implementations, the motion estimation 444 can select an optimal interpolation filter from among the subset of filters 412. For example, the motion estimation 444 can use rate distortion optimization to determine which of the filters in the subset of filters 412 provides the best compression. Various other methods can be used to select an optimal filter.

In various implementations, the selected filter can be identified using a filter index 408. The filter index 408 can identify the filter chosen from among the subset of filters 412. For example, the possible indexes can be 0, 1, or 2 (for F1, F3, and F9, respectively, in the illustrated example), and when filter F1 is selected, the filter index 408 can be "0." In some cases, the filter index 408 can be included, with the motion information 406, in an output bitstream 420. In these implementations, the filter index 408 can be said to be explicitly signaled in the bitstream 420.

In some cases, the filter index 408 can be implicitly signaled; that is the filter index 408 is not included in the bitstream 420, and can instead be derived by a decoder when decoding the bitstream 420. For example, in some cases, the filter selection criteria 414 results in a subset of filters 412 that includes only one filter. As another example, in some cases, the subset of filters 412 may include multiple filters, but the motion estimation 444 determines to use a default filter (e.g., for temporal merge candidates, filter F1 is always selected). In other examples, one or more factors, such as the coding level, prediction mode, and/or a coding tool being used, can be used by the decoder to derive the appropriate filter.

In some implementations, the motion estimation 444 can select a filter based on statics derived from previously coded blocks. For example, in previously coded blocks, some filters from the subset of filters 412 may have never been used, due to having poor performance. In this example, the motion estimation 444 can eliminate poorly performing filters when selecting a filter for the current particular coding unit 402. Conversely, when a particular filter have been used very frequently in previously coded blocks, the motion estimation 444 can prioritize this filter when selecting a filter for the particular coding unit 402.

In some implementations, the motion estimation 444 can select a filter from a neighboring block, such as a spatial neighbor or a temporal neighbor. For example, in some cases, the coding unit 402 may copy the motion vector from a neighboring block. In this example, the coding unit 402 can also borrow the filter index from the same neighboring block. As another example, when a number of neighboring blocks use the same filter, the motion estimation 444 can determine that the coding unit 402 should use the same filter.

In some implementations, the filter selection criteria 414 can be based on various factors. For example, the filter in the subset of filters 412 may be selected based on a prediction mode used for the current block (e.g., inter-prediction, intra-prediction, etc.), a resolution or different of the motion vector, a coding tool (e.g., bi-directional optical flow) being used, and/or the pixels in an overlapped block motion compensation. As another example, the filters in the subset of filters 412 may be selected based on the size and/or shape of the current block, the resolution of the current frame, the distance between the distance between the current frame and the reference frame, and/or a quantization parameters (QP) value for the reference pictures.

As an example, when the coding unit 402 is a large set of data, such as a frame or a slice, or the coding unit 402 has little detail, the filters in the subset of filters 412 can be filters with low cut-offs. A filter with a low cut-off frequency tends to smooth out details, thus when the coding unit 402 has little detail, no data will be lost by using a filter with a low-cut-off frequency. As another example, when the coding unit 402 is a small set of data, such as a coding unit, or the coding unit 402 has a high degree of detail, the subset of filters 412 can include filters with high cut-off frequencies. A filter with a high cut-off frequency can maintain the high frequency components in the coding unit 402, and thus preserve detail.

In some implementations, additional filter candidates can be generated by merging filters from the subset of filters 412. For example, given two filter candidates, even phase shifts from the first candidate filter are merged with odd phase shifts from the second candidate to generated the third candidate. As another example, a fourth candidate can be constructed by combining the odd phase shifts from the first candidate with the even phase shifts from the second candidate.

In some implementations, interpolation filters can be coupled. For example, an interpolation filter for integer samples can be counted to an interpolation filter for fractional samples. In this example, the filter for the integer samples can have a higher cut-off frequency that of the filter with the smallest non-zero phase shift from the filter for the fractional samples. Alternatively, the filter for the integer samples can have a lower cut-off frequency than that of the filter for the fractional samples.

In some implementations, coding tools are also associated with filters. For example, the bi-directional optical flow can use a gradient filter, and frame rate up-conversion can use a refinement filter. In some implementations, a tool-specific filter can be generated according to each filter candidate in the subset of filters 412. For example, given three interpolation filter candidates, three gradient filters can be derived for bi-directional optical flow. In these implementations, by deriving the tool-specific filter, the tool-specific filter need not be described in the output bitstream 420.

In some examples, when filters are applied to both integer pixel positions and fractional pixel positions, the filter for the integer pixel position may be applied first. The filtered integer samples can then be used as inputs for further interpolation to derive the fractional pixel samples.

In some examples, when filters are applied to both integer pixel positions and fractional pixel positions, the filter for the integer pixel positions may only be applicable when an associated motion vector has an integer-degree of precision. In these examples, the fractional pixel samples can be derived using unfiltered pixels at integer positions as inputs.

Figure 5:
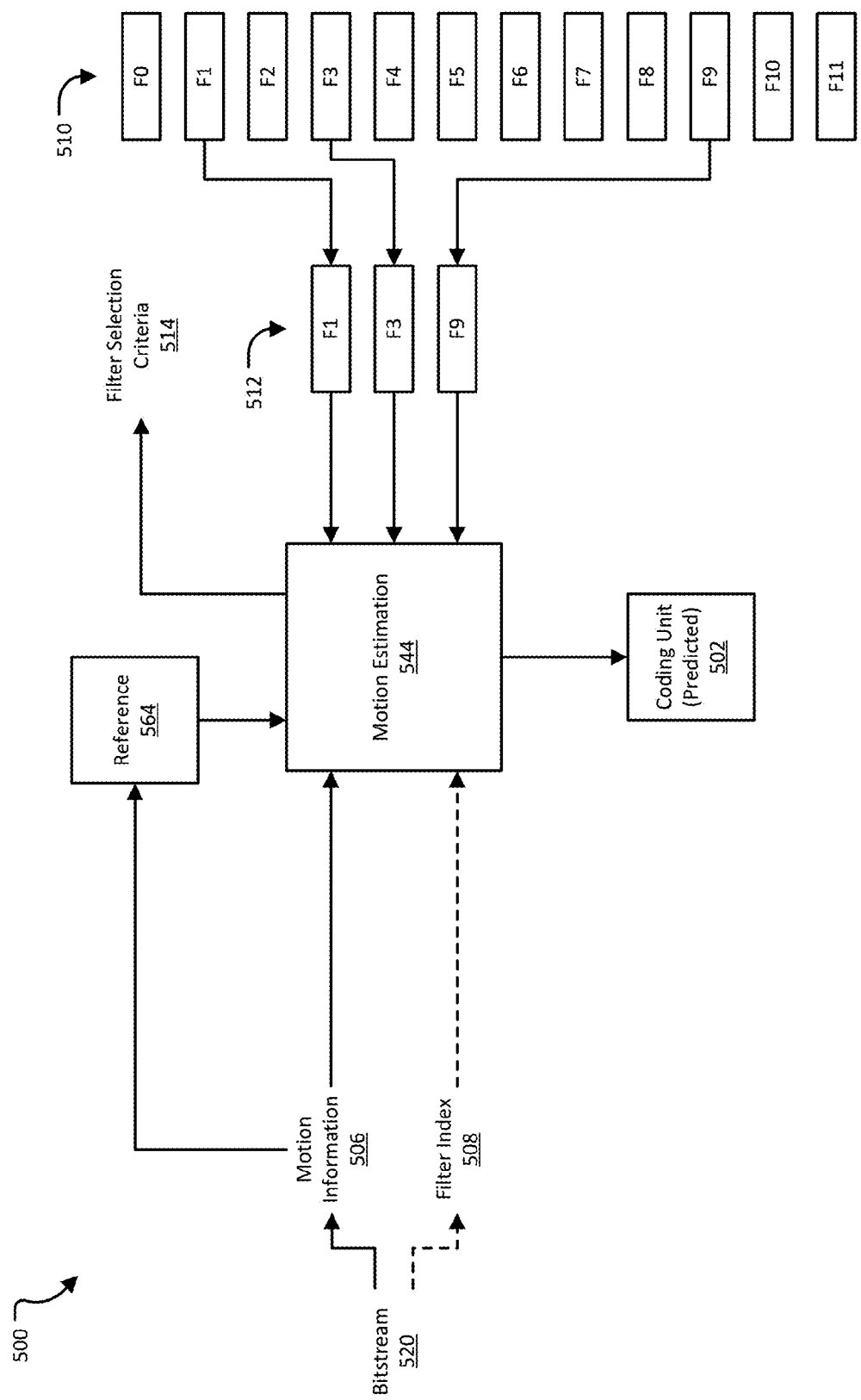
FIG. 5 illustrates an example of a motion estimation step of a decoding process.

FIG. 5 illustrates an example of a motion estimation 544 step of a decoding process 500. Also illustrated in FIG. 5 are a set of filters 510, which represent all the filters that have been defined for use by the codec. In a decoder process 500, motion estimation 544 can be used to reconstruct or predict a prediction unit 502. For the prediction unit 502 in a current frame, an encoded bitstream 520 can include motion information 506. The motion information 506 can include, for example, one or more motion vectors and an index to a reference frame 564. Using the motion information 506, motion estimation 544 can identify a reference block in the reference frame 564, and predict or generate the prediction unit 502.

In some implementations, motion estimation 544 can also determine a filter selection criteria 514. The filter selection criteria 514 can be used to select a subset of filters 512 that are applicable to the prediction unit 502. For example, the filter selection criteria 514 can be based on the coding level of the prediction unit 502, a prediction mode, and/or a coding tool being used. The particular filters in the subset and the number of filters in the subset can change as the bitstream 520 is decoded and different situations are encountered.

In some cases, the bitstream 520 includes an explicit filter index 508 that can be used to select a filter from the subset of filters 512. In various implementations, the filter index 508 can be associated with the motion information 506. When the filter index 508 is included in the bitstream 520, the filter index 508 is said to be explicitly signaled. The filter index 508 can identify the filter from among the subset of filters 512 that should be used for interpolation. For example, the possible indexes can be 0, 1, or 2 (for F1, F3, and F9, respectively, in the illustrated example), and when filter F1 is selected, the filter index 508 can be "0."

In some cases, the decoder process 500 can derive the filter index 508. For example, in some cases, the filter selection criteria 514 results in a subset of filters 512 that includes only one filter. As another example, in some cases, the subset of filters 512 may include multiple filters, but the motion estimation 544 determines to use a default filter (e.g., for temporal merge candidates, filter F1 is always selected). In other examples, one or more factors, such as the coding level, prediction mode, and/or a coding tool being used, can be used by the decoder to derive the appropriate filter. Because the decoder should use the same filter that was determined by the encoder, in cases where the decoder is not able to deterministically derive an identity of the filter, the identity of the filter will be signaled in the bitstream 520.

Various methods can be used to determine an interpolation filter to use when the filter index is implicit. In some examples, interpolation filters can be determined by other blocks that were encoded before of the current block. For example, blocks that satisfy certain conditions can determine filters by inferring or inheriting the filters chosen for other blocks. For example, when the current motion vector is derived from previously coded blocks (as is the case, for example, with spatial merge candidates, affine merge candidates, and other candidates), the interpolation filters that were chosen in for the blocks from which the motion vectors are being derived can be used for the current block. In this example, explicit signaling of a filter index may not be needed because once a decoder has determined the motion vector, the decoder can derive the filter for the current block without needing any additional information.

In some examples, the interpolation filter for certain blocks can always choose or sometimes choose a predetermined default filter. In these examples, searching for a filter or inheritance of the filter from another block is not needed. In some cases, once determined, the default filter is applied at all coding levels. In some examples, the subset of filters can be biased towards selection of a particular filter. For example, filters may be tested sequentially, and a particular filter may be set as the first candidate for blocks that derive motion vectors from frame rate up-conversion, temporal motion vector prediction (TMVP), advanced motion vector prediction (AMVP), or zero-motion vector merge candidates. In some examples, the default filter can change over frames and/or slices. For example, the most frequently-chosen filter in the previous picture(s) and/or slice(s) may be set as a default filter for all blocks belonging to the current picture or slice. Since a decoder can mimic the same procedure without any side information from the encoder, explicit signaling of a filter index may not be required.

Filter indexes can otherwise be explicitly included in a bitstream, as needed. In some examples, a syntax element, which can be called "interpolation_filter_index" can be signaled by the encoder to the decoder to indicate the interpolation filter chosen for the blocks that are not able to choose the filter implicitly. By signaling is meant that the interpolation_filter_index can be included in a bitstream, to be read by the decoder.

In some examples, the value for the interpolation_filter_index can be binarised with a binarisation code, such as fixed-length code, Exponential Golomb code, Unary code, or Truncated Unary code. For example, when there are three filters in a subset of filters, Truncated Unary code can be used to indicate the interpolation_filter_index. In this example, two flags (e.g., FLAG0, and FLAG1) can be used to code the three possible indices, 0, 1, and 2, for the three filters in the subset. For example, the three indices can be coded as (0, N/A), (1, 0), and (1, 1), respectively. In this example, only one flag (FLAG0) can be used to indicate interpolation_filter_index=0.

In some examples, a certain context models can be associated the interpolation_filter_index, which can be used when encoding the interpolation_filter_index. For example, X number of context models can be associated with the interpolation_filter_index, named, for example, interpolation_filter_index_C[0], interpolation_filter_index_C[1], . . . , interpolation_filter_index_C[X−1]. In this example, a context model having index x, interpolation_filter_index_C[x] from among these context models can be chosen as the context to code the interpolation_filter_index for a current block.

In some examples, when the interpolation_filter_index can be represented using two flags, (e.g. FLAG0 and FLAG1), there can be a certain number of context models associated with each flag. For example, there can be Y context models associated with FLAG0, named interpolation_filter_index_C[0], interpolation_filter_index_C[1], interpolation_filter_index_C[Y−1]. In this example, when FLAG0 is set, an context model having index x, interpolation_filter_index_C[x] can be chosen as the context to code interpolation_filter_index of a current block. In this example, FLAG1 may be not set or may not matter. As another example, there can be Z context models associated with FLAG1, named interpolation_filter_index_C[0], interpolation_filter_index_C[1], interpolation_filter_index_C[Z−1]. In this example, when FLAG1 is set, a context model having index x, interpolation_filter_index_C[x] is chosen as the context to code interpolation_filter_index of the current block. In this example, FLAG0 may be not set or may not matter.

In the above examples, x can be selected based on various criteria. For example, x can be based on a size of the current block, a shape of the current block, a resolution of the current frame, an inter-prediction direction, the motion vector(s) for the current block, motion vector differences for the current block, the reference frame for the current block, interpolation_filter_index(es) of neighboring blocks to the current block, some other criteria, or a combination of criteria. In various examples, a function can be used to generate a value for x, where the function can take as input one or more of the above example criteria. In some examples, different functions can be used for different frame resolutions.

In some examples, when x is based on the size of the current block, a threshold, P, can be used to determine a value for x. For example, when the size of the current block is less than P, x can be 0; otherwise, x can be 1. The threshold P can be an integer. The size of the current block can be calculated as M×N, where M and N are the width and height of the current block, in pixels.

In some examples, when x is based on the size of the current block, a value for x can be determined from an integer array, $\{a_K\}$, where the array is sorted in ascending order. For example, x can equal K when $a_{K-1}<=S<a_K$, where S is the size of the current block. In this example, S can be the number of pixels in the current block, calculated as M×N, where M and N are the width and height of the current block, in pixels.

In some examples, when x is based on the shape of the current block, a value for x can be determined from a relationship between the height and width of the block. For example, given a height M and a width N for the current block, when M<N, x can equal 0; when M=N, x can equal 1; and when M>N, x can equal 2.

In some examples, when x is based on the prediction direction of the current block, a value for x can be determined from the prediction direction. For example, when the current block is coded with uni-inter-prediction, x can be equal to 0, and when the current block is coded with bi-inter-prediction, x can be equal to 1. As another example, the value for x can be based on a value InerDir, where InterDir is 1 when the current block is coded with uni-inter-prediction from reference list 0; InterDir is 2 when the current block is coded with uni-inter-prediction from reference list 1; and InterDir is 3 when the current block is coded with bi-inter-prediction. In this example, x can be equal to InterDir−1.

In some examples, when x is based on the interpolation_filter_index of a neighboring block, a value for x can be determined from the interpolation_filter_index of one or more neighboring blocks. For example, a value for x can be determined by a function $f$ (left_idx, top_idx), where left_idx is the interpolation_filter_index of the left neighboring block and top_idx is the interpolation_filter_index of the top neighboring block. The function $f$ can be any function. In some examples, different functions can be used for different frame resolutions. Alternatively or additionally, the value for x can be equal to a+b, where a is equal to 1 when the interpolation_filter_index of the left neighboring block is available and is larger than zero (otherwise a is equal to 0), and b is equal to 1 when the interpolation_filter_index of the top neighboring block is available and larger than zero (otherwise b is equal to 0).

In some examples, a combination of factors can be considered when determine a value for x. For example, the size of the current block can be used to select interpolation_filter_index values from neighboring blocks. For example, x can be equal to the result of $f$(left_idx, top_idx) when the size of the current picture less than a threshold P, where P is an integer and the size of the current block as calculated M×N, where M and N are the width and height of the current block in pixels. When the size of the current block is greater than or equal to P, x can be equal to the output of a function g(left_idx, top_idx).

An example application of switching interpolation filters is now described. As noted above, a best filter can be chosen for each block from among N filters that can have different characteristics. The best filter can be selected, for example, using rate distortion optimization, or some other selection mechanism.

To reduce encoder complexity, the best filter can be either inherited from blocks that are already coded, re-used from previous decisions, or fixed without evaluating the performance of all available filters. To reduce signaling overhead, a fixed set of filters are determined in advance, and an encoder can signal the filter index to the decoder instead of filter coefficients.

The example that follows uses HM16.6-based JEM3.0 to demonstrate an application of switching interpolation filters. JEM is a project of the International Telecommunications Union Video Coding Experts Group (ITU-VCEG) and the International Standards Organization/International Electrotechnical Commission Motion Picture Experts Group (ISO/IEC MPEG). JEM is reference software that provides a platform for studying and potentially standardizing video coding technology that has better compression capability than HEVC.

In the following example, the coding unit is a block defined in the QTBT structure implemented on JEM3.0. In other examples, coding unit can be a larger structure, such as a collection of QTBT blocks, a CTU, a slice, a picture, a sequence, or another suitable coding unit. Note that the example shows only interpolation filters for luma components, and that switching interpolation filters could be extended to chroma components as well as to integer samples.

In the example, the candidate set of interpolation filters includes three filters with different characteristics: one 12-tap filter (F0) and two 8-tap filters (F1 and F2). Filter F0 is illustrated in Table 3, filter F1 is illustrated in Table 4, and filter F2 is illustrated in Table 5. In this example, the set of filter candidates does not change over different pictures and/or slices. Since JEM3.0 supports up to 1/16 motion vector resolution, each filter candidate is constructed with 16 different phase shifts as shown in the following tables.

TABLE 3

| Phase shift | Coefficients (F0) |
|---|---|
| 0 | {0, 0, 0, 0, 0, 256, 0, 0, 0, 0, 0, 0}, |
| 1 | {−1, 2, −4, 7, −14, 254, 16, −7, 4, −2, 1, 0}, |
| 2 | {−1, 4, −7, 12, −27, 249, 35, −15, 8, −4, 2, 0}, |
| 3 | {−2, 5, −10, 17, −36, 241, 54, −22, 12, −6, 3, 0}, |
| 4 | {−2, 6, −12, 21, −44, 232, 75, −30, 16, −9, 4, −1}, |
| 5 | {−2, 7, −13, 24, −49, 215, 97, −36, 19, −10, 5, −1}, |
| 6 | {−2, 7, −14, 26, −51, 198, 119, −42, 22, −12, 6, −1}, |
| 7 | {−2, 7, −14, 26, −52, 183, 140, −47, 24, −13, 6, −2}, |
| 8 | {−2, 7, −14, 26, −50, 161, 161, −50, 26, −14, 7, −2}, |
| 9 | {−2, 6, −13, 24, −47, 140, 183, −52, 26, −14, 7, −2}, |
| 10 | {−1, 6, −12, 22, −42, 119, 198, −51, 26, −14, 7, −2}, |
| 11 | {−1, 5, −10, 19, −36, 97, 215, −49, 24, −13, 7, −2}, |
| 12 | {−1, 4, −9, 16, −30, 75, 232, −44, 21, −12, 6, −2}, |
| 13 | {0, 3, −6, 12, −22, 54, 241, −36, 17, −10, 5, −2}, |
| 14 | {0, 2, −4, 8, −15, 35, 249, −27, 12, −7, 4, −1}, |
| 15 | {0, 1, −2, 4, −7, 16, 254, −14, 7, −4, 2, −1}, |

TABLE 4

| Phase shift | Coefficients (F1) |
|---|---|
| 0 | {0, 0, 0, 256, 0, 0, 0, 0}, |
| 1 | {2, −9, 21, 185, 80, −27, 4, 0}, |
| 2 | {2, −9, 15, 181, 90, −27, 3, 1}, |
| 3 | {2, −8, 9, 176, 100, −26, 2, 1}, |
| 4 | {2, −7, 4, 171, 108, −24, 1, 1}, |
| 5 | {2, −6, −1, 165, 117, −22, 0, 1}, |
| 6 | {2, −5, −6, 158, 127, −20, −1, 1}, |
| 7 | {2, −4, −10, 151, 134, −17, −2, 2}, |
| 8 | {2, −3, −14, 143, 143, −14, −3, 2}, |
| 9 | {2, −2, −17, 134, 151, −10, −4, 2}, |
| 10 | {1, −1, −20, 127, 158, −6, −5, 2}, |
| 11 | {1, 0, −22, 117, 165, −1, −6, 2}, |
| 12 | {1, 1, −24, 108, 171, 4, −7, 2}, |
| 13 | {1, 2, −26, 100, 176, 9, −8, 2}, |
| 14 | {1, 3, −27, 90, 181, 15, −9, 2}, |
| 15 | {0, 4, −27, 80, 185, 21, −9, 2}, |

TABLE 5

| Phase shift | Coefficients (F2) |
|---|---|
| 0 | {0, 0, 0, 256, 0, 0, 0, 0,}, |
| 1 | {1, 15, 61, 97, 70, 17, −3, −2,}, |
| 2 | {0, 13, 58, 96, 73, 20, −2, −2,}, |
| 3 | {0, 11, 55, 95, 75, 23, −1, −2,}, |
| 4 | {0, 10, 51, 94, 77, 26, 0, −2,}, |
| 5 | {0, 8, 48, 92, 80, 29, 1, −2,}, |

TABLE 5-continued

| Phase shift | Coefficients (F2) |
|---|---|
| 6 | {−1, 7, 45, 90, 82, 32, 2, −1,}, |
| 7 | {−1, 5, 41, 88, 86, 35, 3, −1,}, |
| 8 | {−1, 4, 38, 87, 87, 38, 4, −1,}, |
| 9 | {−1, 3, 35, 86, 88, 41, 5, −1,}, |
| 10 | {−1, 2, 32, 82, 90, 45, 7, −1,}, |
| 11 | {−2, 1, 29, 80, 92, 48, 8, 0,}, |
| 12 | {−2, 0, 26, 77, 94, 51, 10, 0,}, |
| 13 | {−2, −1, 23, 75, 95, 55, 11, 0,}, |
| 14 | {−2, −2, 20, 73, 96, 58, 13, 0,}, |
| 15 | {−2, −3, 17, 70, 97, 61, 15, 1,}, |

Figure 6:
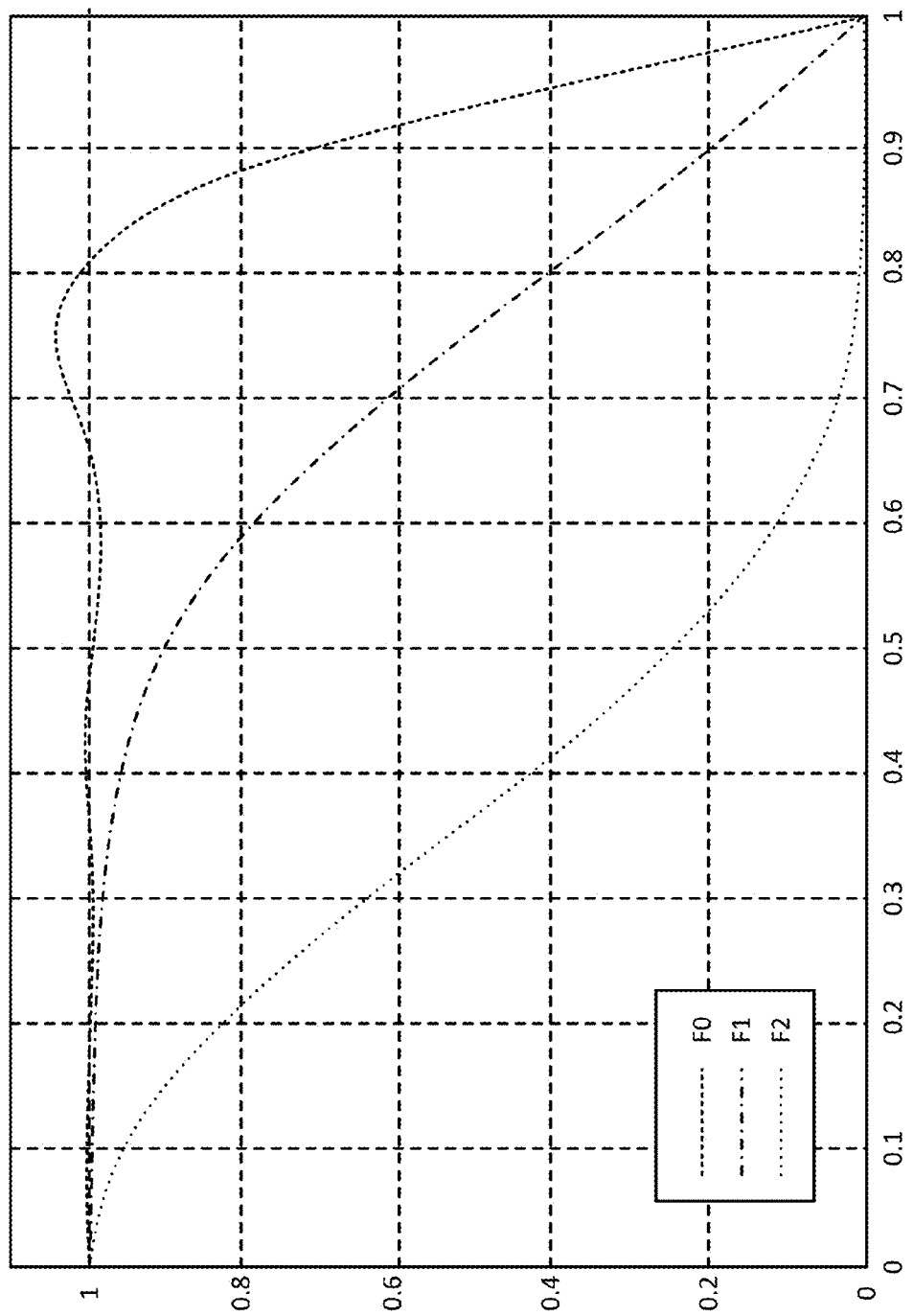
FIG. 6 is a graph illustrating the frequency response of three example filters, F0, F1, and F2.

FIG. 6 is a graph illustrating the frequency response of three example filters, F0, F1, and F2. Each curve corresponds to the same phase shift of 8 for each filter. As illustrated by this example, filter F0 has a high cut-off frequency, while filter F2 has a low cut-off frequency. Filter F1 has a fairly neutral cut-off frequency.

Continuing with the example, for a given coding unit, one of the filters F0, F1, and F2 can be chosen. The selected filter can be implicitly or explicitly signaled.

In this example, implicit signaling of a filter index is enabled for merge mode because the decoder can mimic the same procedure that the encoder executes to determine merge motion vector candidates, without any side information from encoder. For example, an interpolation filter for the coding unit can be determined either by inheriting the filter index from the blocks that the current motion is derived from or selecting a default filter, which, in this example, is filter F0.

Continuing with the example, the filter inheritance can be used when the current motion is derived from spatial merge candidates, combined-merge candidates when the two candidates being combined use the identical filter, and affine merge candidates. In each of these cases the contents of the block that is inherited from can affect the selection of the filter. Also in this example, the default filter, F0, is selected when the current motion vector is derived from frame rate up-conversion merge candidates or temporal merge candidates (e.g. TMVP, AMVP, STMVP, and zero-motion vector) candidates. In each of these cases, a filter with a high cut-off frequency may be desirable, in order to preserve detail in the block.

Continuing with the example, explicit signaling of the filter index is enable for AMVP mode. In JEM3.0, two additional rate-distortion optimizations are included in the encoder, which can be used to choose the best filter from the three example filter candidates. The additional optimization process can be simplified by reusing integer motion vectors or skipping the additional process by re-using the filter chosen in a specific configuration. As one example, for the illumination compensation (IC) tool, the filter chosen when illumination compensation is off can be reused in the case when illumination compensation is on. This can decrease the encoding time.

Continuing with the example, when explicit signaling of the filter index is enabled, interpolation_filter_index can be binarised using "0" for F0, "10" for F1, and "11" for F2. Two flags, FLAG0 and FLAG1 can be used to code interpolation_filter_index, as follows:

FLAG0
if (FLAG0)
FLAG1

Continuing the above example, two contexts can be provided for each flag: (FLAG0_ctx0, FLAG0_ctx1) for FLAG0, and (FLAG1_ctx0, FLAG1_ctx1) for FLAG1. As an example, when the current block is coded with uni-prediction, FLAG0_ctx0 can be used to code FLAG0 and FLAG_ctx0 can be used to code FLAG1. As another example, when the current block is coded with bi-prediction, FLAG0_ctx1 can be used to code FLAG0 and FLAG1_ctx1 can be used to code FLAG1.

In another example of encoding two interpolation candidates, F0 and F2, interpolation_filter_index can be binarised as "0" for F0 and "1" for F1. In this example, one flag can be used to code interpolation_filter_index. Each flag can have an associated context, FLAG0_ctx0 and FLAG0_ctx1. When the size of the current block is less than (for purposes of this example) 256, FLAG0_ctx0 can be used to code FLAG0. Otherwise, when the size is greater than or equal to 256, FLAG0_ctx1 can be used to code FLAG0. The size of the current block is calculated as w×h, where w and h represent the width and height, respectively, of the current block in pixels.

Figure 7:
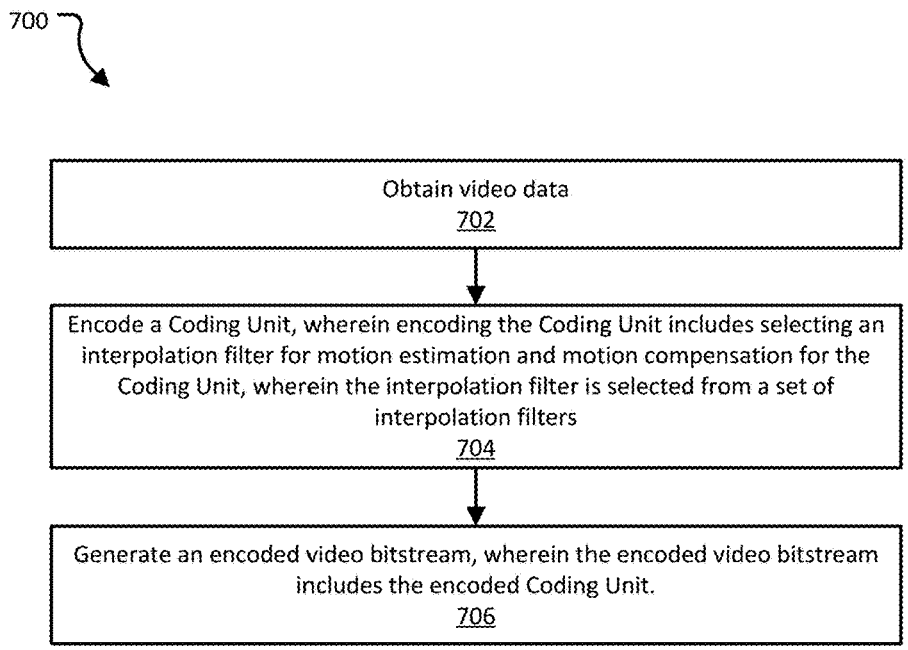
FIG. 7 illustrates an example of a process for switching interpolation filters during an encoding process.

FIG. 7 illustrates an example of a process 700 for switching interpolation filters during an encoding process. At 702, the process 700 includes obtaining video data. The video data can be obtained, for example, from a video capture device such as a camera. Alternatively or additionally, the video data can be read from a stored location.

At 704, the process includes encoding a coding unit, wherein encoding the processing includes selecting an interpolation filter for motion estimation and motion compensation for the coding unit, wherein the interpolation filter is selected from a set of interpolation filters. In some implementations, the interpolation filter is selected from a subset of interpolation filters, selected from the set of interpolation filters. In some implementations, the subset of interpolation filters is determined based on a coding level of the coding unit. In some implementations, the subset is determined based on a prediction mode of the coding unit. In some implementations, the subset is determined based on a result of the motion estimation. In some implementations, the subset is determined based on a coding tool used to code the coding unit.

In some implementations, the interpolation filter is selected from a previously coded block. In some implementations, the interpolation filter is selected from a neighboring block.

In some implementations, the interpolation filter is merged with another interpolation filters, and the resulting merged interpolation filter is used for the motion estimation.

In some implementations, the interpolation filter is coupled to a second interpolation filter. In these implementations, the interpolation filter can be for an integer pixel location and the second interpolation filter can be for a fractional pixel location. In some implementations, the interpolation filter and the second interpolation filter can have different cut-off frequencies.

At 706, the process 700 includes generating an encoded video bitstream, wherein the video bitstream includes the encoded coding unit. In some implementations, the encoded video bitstream can include an explicit value that identifies the selected interpolation filter, such as a filter index. In some implementations, the value that identifies the interpolation filter can be implied from the encoded video bitstream.

Figure 8:
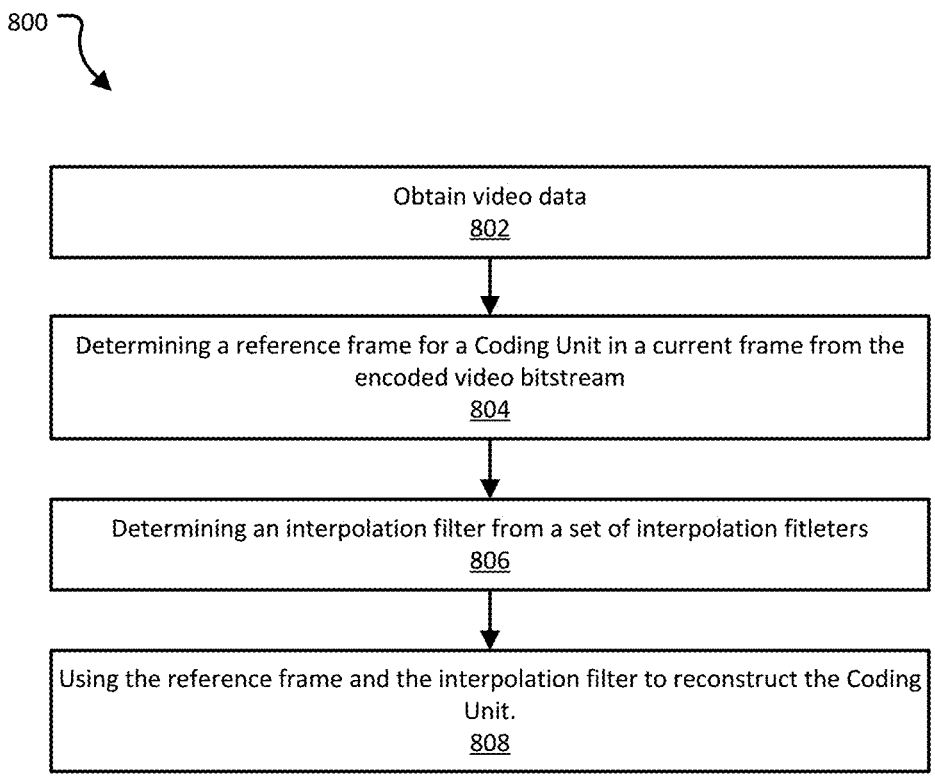
FIG. 8 is an example of a process for switching interpolation filters in a decoding process.

FIG. 8 is an example of a process 800 for switching interpolation filters in a decoding process. At 802, the process 800 includes obtaining an encoded video bitstream. The bitstream can be obtained, for example, for a storage location and/or over a network.

At 804, the process 800 includes determining a reference frame for a coding unit in a current frame from the encoded video bitstream. The reference frame can temporally precede or follow the current frame. The reference frame can be the same frame as the current frame.

At 806, the process 800 includes determining an interpolation filter from a set of interpolation filters. In some implementations, the interpolation filter can be selected from a subset of interpolation filters from the set of interpolation filters. In some implementations, the subset of interpolation filters can be determined based on a coding level of the coding unit. In some implementations, the subset can be determined based on a prediction mode for the coding unit. In some implementations, the subset can be determined based on a result of motion estimation. In some implementations, the subset can be determined based on a coding tool used to code the coding unit.

In some implementations, the interpolation filter can be selected from a previously coded block. In some implementations, the interpolation filter can be selected from a neighboring block.

In some implementations, the interpolation filter can be merged with a second interpolation filter, and a resulting merged interpolation filter can be used for motion estimation.

In some implementations, the interpolation filter can be coupled to a second interpolation filter. In these implementations, the interpolation filter can be for an integer pixel location, and the second interpolation filter can be for a fractional pixel location. In some implementations, the interpolation filter and the second interpolation filter can have different cut-off frequencies.

In some implementations, the encoded video bitstream includes an explicit value, such as a filter index. that identifies the selected interpolation filter. In some implementations, the process includes deriving the identity of the interpolation filter, using data from the bitstream.

At 808, the process 800 includes using the reference frame determined 804 and the interpolation filter determined at 806 to reconstruct the coding unit.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 9:
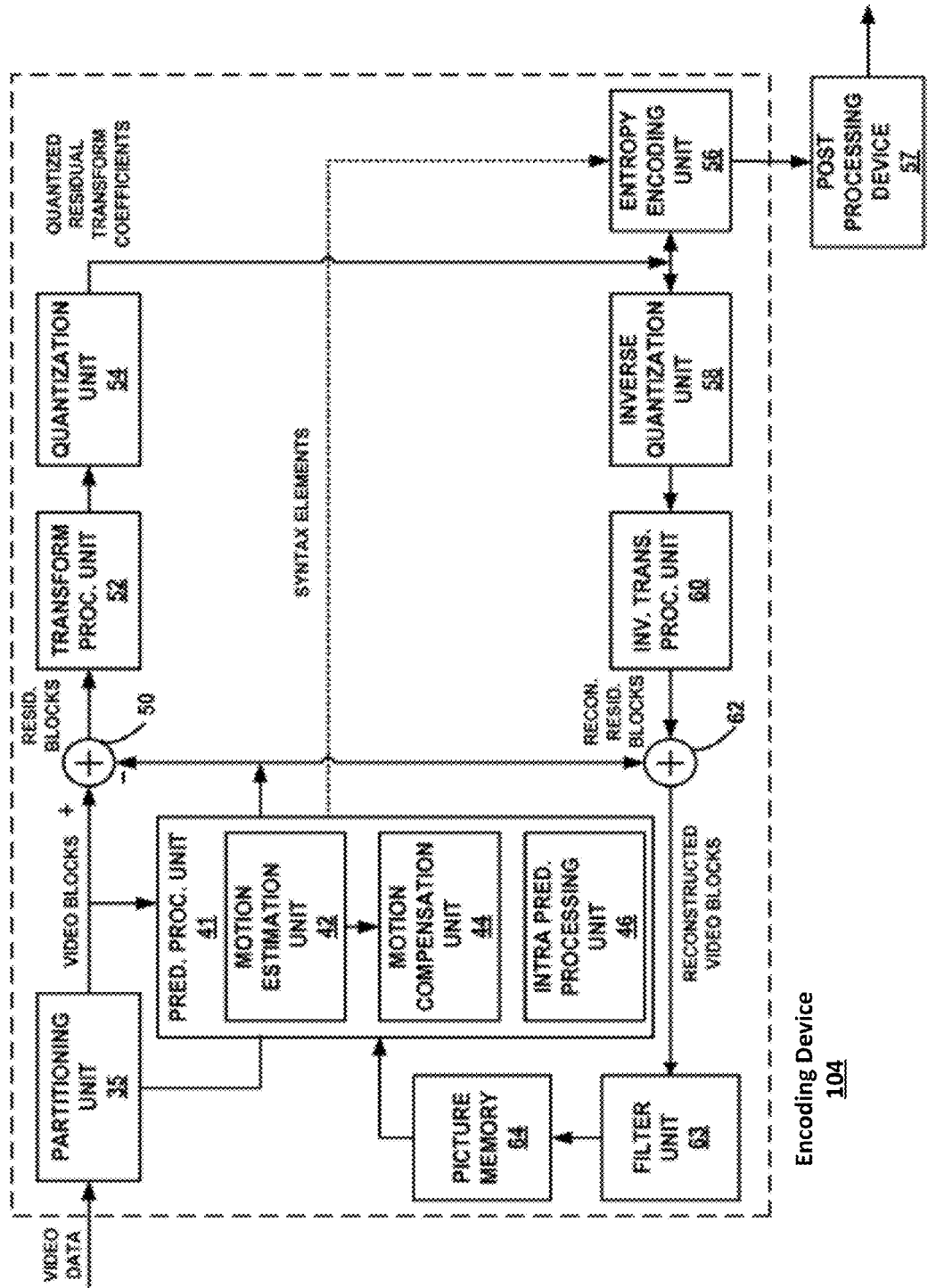
FIG. 9 is a block diagram illustrating an example encoding device.
Figure 10:
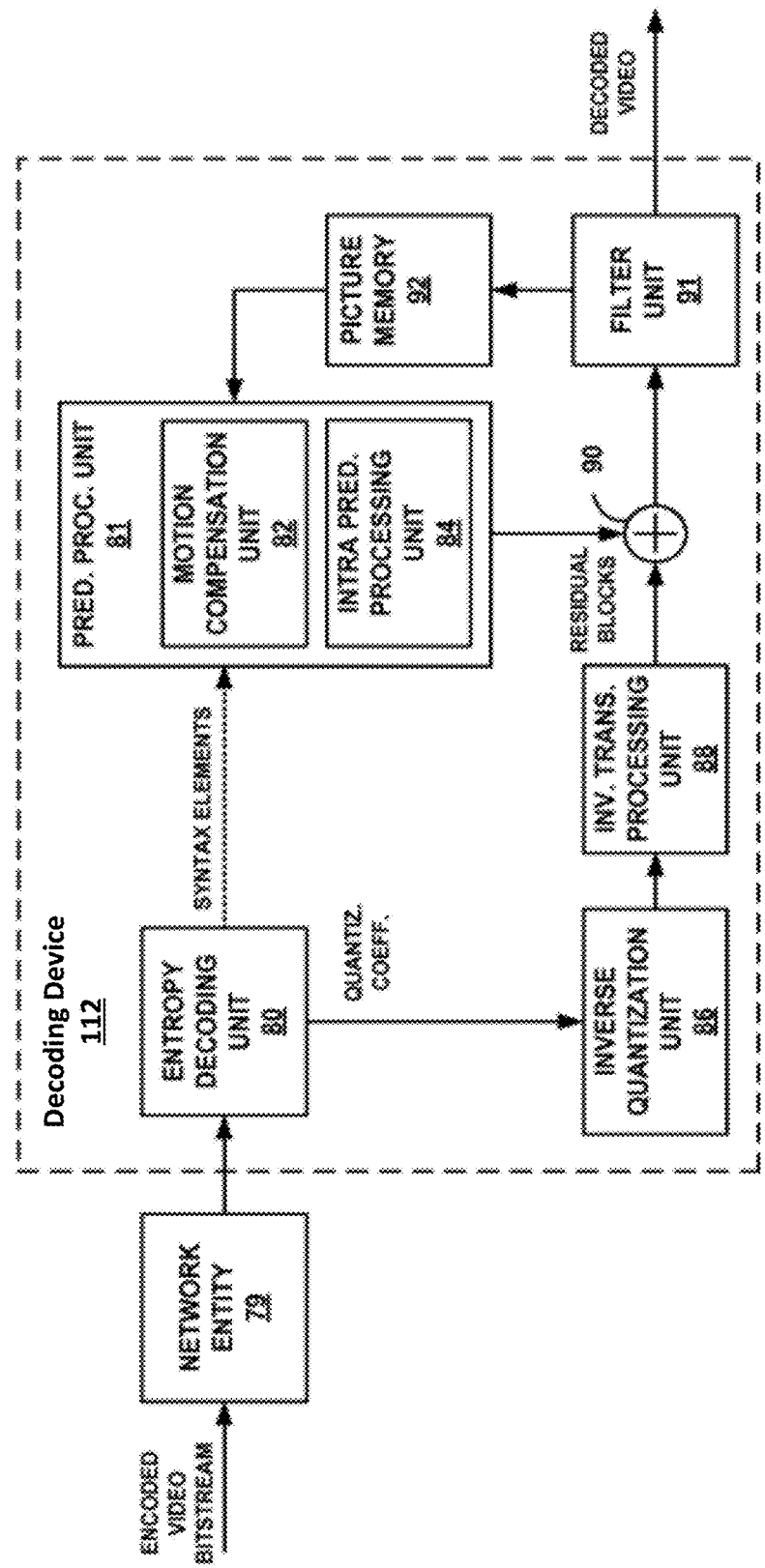
FIG. 10 is a block diagram illustrating an example video decoding device.

Specific details of the encoding device 104 and the decoding device 112 are shown in FIG. 9 and FIG. 10, respectively. FIG. 9 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 9 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 9, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 9 represents an example of a video encoder configured to generate syntax for a encoded video bitstream. The encoding device 104 may, for example, generate VPS, SPS, and PPS parameter sets as described above. The encoding device 104 may perform any of the techniques described herein, including the processes described above. The techniques of this disclosure have generally been described with respect to the encoding device 104, but as mentioned above, some of the techniques of this disclosure may also be implemented by post processing device 57.

FIG. 10 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 10.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 10 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of encoding video data, comprising:
obtaining the video data;
determining, for a coding unit, a subset of interpolation filters from a set of interpolation filters, the subset of interpolation filters including a plurality of interpolation filters, wherein the subset of interpolation filters is determined based on information, in the video data, associated with the coding unit;
encoding the coding unit, wherein encoding the coding unit includes selecting an interpolation filter for motion estimation and motion compensation for the coding unit, and wherein the interpolation filter is selected from the subset of interpolation filters; and
generating an encoded video bitstream, wherein the encoded video bitstream includes the encoded coding unit.

2. The method of claim 1, wherein the subset of interpolation filters is determined based on a coding level of the coding unit.

3. The method of claim 1, wherein the subset of interpolation filters is determined based on a prediction mode for the coding unit.

4. The method of claim 1, wherein the subset of interpolation filters is determined based on motion information associated with the coding unit.

5. The method of claim 1, wherein the subset of interpolation filters is determined based on a coding tool used to code the coding unit.

6. The method of claim 1, wherein the subset of interpolation filters is determined based on a size of the coding unit.

7. The method of claim 1, wherein the interpolation filter is selected from a previously coded block.

8. The method of claim 1, wherein the interpolation filter is selected from a neighboring block of the coding unit.

9. The method of claim 1, further comprising:
merging the interpolation filter with a second interpolation filter, wherein a resulting merged interpolation filter is used for the motion estimation and the motion compensation.

10. The method of claim 1, wherein the interpolation filter is associated with a second interpolation filter, wherein the interpolation filter is for an integer pixel location, and wherein the second interpolation filter is for a fractional pixel location.

11. The method of claim 10, wherein the interpolation filter and the second interpolation filter have different cut-off frequencies.

12. The method of claim 1, wherein the encoded video bitstream includes a value identifying the interpolation filter.

13. The method of claim 1, wherein the set of interpolation filters are not signaled with the encoded video bitstream, and wherein an identity of the interpolation filter can be implied from the encoded video bitstream.

14. An apparatus, comprising:
a memory configured to store video data; and
a processor configured to:
obtain the video data;
determine, for a coding unit, a subset of interpolation filters from a set of interpolation filters, the subset of interpolation filters including a plurality of interpolation filters, wherein the subset of interpolation filters is determined based on information, in the video data, associated with the coding unit;
encode the coding unit, wherein encoding the processing includes selecting an interpolation filter for motion estimation and motion compensation, and wherein the interpolation filter is selected from the subset of interpolation filters; and
generate an encoded video bitstream, wherein the encoded video bitstream includes the encoded coding unit.

15. The apparatus of claim 14, wherein the apparatus comprises a mobile device with a camera for capturing pictures.

16. A computer-readable medium having stored thereon instructions that, when executed by a processor, cause the processor to perform operations including:
obtaining video data;
determining, for a coding unit, a subset of interpolation filters from a set of interpolation filters, the subset of interpolation filters including a plurality of interpolation filters, wherein the subset of interpolation filters is determined based on information, in the video data, associated with the coding unit;
encoding the coding unit, wherein encoding the coding unit includes selecting an interpolation filter for motion estimation and motion compensation, and wherein the interpolation filter is selected from the subset of interpolation filters; and
generating an encoded video bitstream, wherein the encoded video bitstream includes the encoded coding unit.

17. An apparatus for encoding video data, comprising:
means for obtaining video data;
means for determining, for a coding unit, a subset of interpolation filters from a set of interpolation filters, the subset of interpolation filters including a plurality of interpolation filters, wherein the subset of interpolation filters is determined based on information, in the video data, associated with the coding unit;
means for encoding the coding unit, wherein the means for encoding the coding unit includes selecting an interpolation filter for motion estimation and motion compensation, and wherein the interpolation filter is selected from a set of interpolation filters; and
means for generating an encoded video bitstream, wherein the encoded video bitstream includes the encoded coding unit.

18. A method of decoding video data, comprising:
obtaining an encoded video bitstream;
determining a reference frame for a coding unit in a current frame from the encoded video bitstream;
determining a subset of interpolation filters from a set of interpolation filters, the subset of interpolation filters including a plurality of interpolation filters, wherein the subset of interpolation filters is determined based on information, in the encoded video bitstream, associated with the coding unit;
determining an interpolation filter from the subset of interpolation filters; and
using the reference frame and the interpolation filter to reconstruct the coding unit.

19. The method of claim 18, wherein the subset of interpolation filters is determined based on a coding level of the coding unit.

20. The method of claim 18, wherein the subset of interpolation filters is determined based on a prediction mode for the coding unit.

21. The method of claim 18, wherein the subset of interpolation filters is determined based on motion information associated with the coding unit.

22. The method of claim 18, wherein the subset of interpolation filters is determined based on a coding tool used to code the coding unit.

23. The method of claim 18, wherein the subset of interpolation filters is determined based on a size of the coding unit.

24. The method of claim 18, wherein the interpolation filter is selected from a previously coded block.

25. The method of claim 18, wherein the interpolation filter is selected from a neighboring block.

26. The method of claim 18, further comprising:
merging the interpolation filter with a second interpolation filter, wherein a resulting merged interpolation filter is used for reconstructing the coding unit.

27. The method of claim 18, wherein the interpolation filter is associated with a second interpolation filter, wherein the interpolation filter is for an integer pixel location, and wherein the second interpolation filter is for a fractional pixel location.

28. The method of claim 27, wherein the interpolation filter and the second interpolation filter have different cut-off frequencies.

29. The method of claim 18, wherein the encoded video bitstream includes a value identifying the interpolation filter.

30. The method of claim 18, further comprising:
deriving an identity of the interpolation filter using the encoded video bitstream.

31. An apparatus, comprising:
a memory configured to store encoded video data; and
a processor configured to:
obtain an encoded video bitstream;
determine a reference frame for a coding unit in a current frame from the encoded video bitstream;
determine a subset of interpolation filters from a set of interpolation filters, the subset of interpolation filters including a plurality of interpolation filters, wherein the subset of interpolation filters is determined based on information, in the encoded video bitstream, associated with the coding unit;
determine an interpolation filter from the subset of interpolation filters; and
use the reference frame and the interpolation filter to reconstruct the coding unit.

32. The apparatus of claim 31, further comprising:
a display for displaying the video data.

33. The apparatus of claim 31, wherein the apparatus comprises a mobile device with a camera for capturing pictures.

34. A computer-readable medium having stored thereon instructions that, when executed by a processor, cause the processor to perform operations including:
obtaining an encoded video bitstream;
determining a reference frame for a coding unit in a current frame from the encoded video bitstream;
determining a subset of interpolation filters from a set of interpolation filters, the subset of interpolation filters including a plurality of interpolation filters, wherein the subset of interpolation filters is determined based on information, in the encoded video bitstream, associated with the coding unit;
determining an interpolation filter from the subset of interpolation filters; and
using the reference frame and the interpolation filter to reconstruct the coding unit.

35. An apparatus for decode video data, comprising:
means for obtaining an encoded video bitstream;
means for determining a reference frame for a coding unit in a current frame from the encoded video bitstream;
means for determining a subset of interpolation filters from a set of interpolation filters, the subset of interpolation filters including a plurality of interpolation filters, wherein the subset of interpolation filters is determined based on information, in the encoded video bitstream, associated with the coding unit;
means for determining an interpolation filter from the subset of interpolation filters; and
means for using the reference frame and the interpolation filter to reconstruct the coding unit.

* * * * *